United States Patent
Adam et al.

(10) Patent No.: US 8,516,386 B2
(45) Date of Patent: Aug. 20, 2013

(54) SCROLLING VIRTUAL MUSIC KEYBOARD

(75) Inventors: Christof Adam, Norderstedt (DE); Elliott Harris, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 408 days.

(21) Appl. No.: 12/893,971

(22) Filed: Sep. 29, 2010

(65) Prior Publication Data

US 2012/0079410 A1    Mar. 29, 2012

(51) Int. Cl.
*G06F 3/048* (2006.01)

(52) U.S. Cl.
USPC ........... 715/773; 715/716; 715/727; 715/771; 345/173; 984/368; D17/1

(58) Field of Classification Search
USPC ................. 715/716, 727, 771, 773; 345/173; 984/388; D17/1
See application file for complete search history.

(56) References Cited

U.S. PATENT DOCUMENTS

| | | | |
|---|---|---|---|
| 5,889,236 A | | 3/1999 | Gillespie et al. |
| 6,915,488 B2 * | | 7/2005 | Omori et al. .................. 715/773 |
| 8,175,288 B2 | | 5/2012 | Lengeling et al. |
| 2009/0027338 A1 | | 1/2009 | Weinberg et al. |
| 2009/0093275 A1 * | | 4/2009 | Oh et al. ...................... 455/566 |
| 2009/0256817 A1 | | 10/2009 | Perlin et al. |
| 2010/0053105 A1 | | 3/2010 | Choi |
| 2010/0287471 A1 * | | 11/2010 | Nam et al. ..................... 715/702 |
| 2011/0088535 A1 | | 4/2011 | Zarimis |
| 2011/0316793 A1 | | 12/2011 | Fushiki |
| 2012/0057012 A1 | | 3/2012 | Sitrick et al. |
| 2012/0071994 A1 * | | 3/2012 | Lengeling ...................... 700/94 |

FOREIGN PATENT DOCUMENTS

JP    2010204162    9/2010

OTHER PUBLICATIONS

MooCowMusic, "Pianist—The iPhone Piano (V1.0)", http://www.youtube.com/watch?v=4fE45bT8F6Y, Jul. 2, 2008.*
The Telegraph, "iPad piano app tested by concert pianist Stephen Hough", http://www.telegraph.co.uk/technology/technology-video/gadget-inspectors/7765046/iPad-piano-app-tested-by-concert-pianist.html, May 25, 2010.*
24x7digital, "MiniVLTone for iPhone and iPod Touch", http://www.youtube.com/watch?v=C5EhkL-5sKc, Mar. 7, 2009.*

(Continued)

*Primary Examiner* — Patrick Riegler
(74) *Attorney, Agent, or Firm* — Fish & Richardson P.C.

(57) ABSTRACT

Disclosed are systems, methods, and non-transitory computer-readable storage media for scrolling a virtual keyboard on a touch screen device including a display. A first aspect allows detecting a user contact swipe motion in a predetermined direction along said keyboard, scrolling said keyboard across said display in accordance with said motion, and stopping said scrolling upon termination of user contact swipe motion. A second aspect allows scrolling of a virtual keyboard to snap to an intelligent position based on a song key or relative minor of the song key. A third aspect allows a note to be held when a user's finger remains in contact with the display even though the finger is no longer in contact with a key linked to the note on the keyboard as a result of scrolling. A fourth aspect displays a second musical instrument keyboard adjacent to a first musical instrument keyboard, wherein said second musical instrument keyboard is linked to said first musical instrument keyboard such that scrolling of one keyboard causes automatic scrolling of the other keyboard.

25 Claims, 19 Drawing Sheets

(56) References Cited

OTHER PUBLICATIONS

Apple iTunes App Store, "PockeStra Piano (Wheel Drive)", by hixtar, updated Sep. 17, 2009 (Available online at http://itunes.apple.com/us/app/pockestra-piano-wheel-drive/id295475453?mt=8, last visited Jul. 17, 2010).

Apple iTunes App Store, "remoteKB for iPad", by nekorl, released Jun. 19, 2010 (Available online at http://itunes.apple.com/us/app/remotekb-for-ipad/id376500525?mt=8, last visited Jul. 17, 2010).

Apple iTunes App Store, "Mobilesynth by Allen Porter", by ECSOS, released Dec. 9, 2009 (Available online at http://itunes.apple.com/us/app/mobilesynth-by-allen-porter/id343230453?mt=8, last visited Jul. 17, 2010).

Apple iTunes App Store, "Bright Keys: Slide, Glide, Volume and Multitouch", by Macsolving, released Jan. 16, 2010 (Available online at http://itunes.apple.com/us/app/bright-keys-slide-glide-volume/id350167953?mt=8, last visited Jul. 17, 2010).

Apple iTunes App Store, "FreePiano+", by tekunodo, released Sep. 18, 2009 (Available online at http://itunes.apple.com/us/app/freepiano/id330945465?mt=8, downloaded Jul. 17, 2010).

Apple iTunes App Store, "Neon Organ Deluxe", by Macsolving, updated Nov. 2, 2009 (Available online at http://itunes.apple.com/us/app/neon-organ-deluxe/id327023631?mt=8#, downloaded Jul. 17, 2010).

Apple iTunes App Store, "VoiceKeyboard HD", by Terry Demco, updated Jun. 6, 2010 (Available online at http://itunes.apple.com/us/app/voicekeyboard-hd/id364923034?mt=8, downloaded Jul. 17, 2010).

Apple iTunes App Store, "Master Piano", by Better Day Wireless, updated May 25, 2010 (Available online at http://itunes.apple.com/us/app/master-piano/id364897373?mt=8#, downloaded Jul. 17, 2010).

Apple iTunes App Store, "Play Piano", by The Useful Group, released Dec. 15, 2009 (Available online at http://itunes.apple.com/us/app/play-piano/id344673559?mt=8, downloaded Jul. 17, 2010).

\* cited by examiner

SCROLLING VIRTUAL MUSIC KEYBOARD

FIELD

The following relates to scrolling a virtual keyboard on a touch screen device.

BACKGROUND

A traditional piano contains 7 octaves plus a minor third and 88 keys. A handheld wireless electronic device with a touch-sensitive screen input can run a virtual keyboard program that allows a user to play and record music. However, due to size dimensions of current devices only a fraction of a full 88-key keyboard is displayed on the touch-sensitive screen at a time. For example, an electronic device with a touch-sensitive screen input can display only one or two octaves of a musical keyboard at a time and still display keys that are large enough for ordinary users to play. However, users may wish to access other keys and octaves of a full 88-key keyboard for more options in creating sounds and music.

Current virtual keyboards on a handheld electronic device with a touch-sensitive screen input can allow a user to change the octaves displayed on the touch-sensitive screen by accessing a "+" or "−" button. For example, by pressing a "+" button, the user can cause the touch-sensitive display to show higher octaves, one octave shift higher for each press. Similarly, by pressing a "−" button, the user can cause the touch-sensitive display to show lower octaves, one octave shift lower for each press.

However, this implementation has limitations in that changes can only be made in octave increments. Also, the user must cease playing the keyboard, adjust the visible octaves using the "+/−" button, and then resume playing.

Therefore users can benefit from a method and system for scrolling a virtual keyboard on a touch screen device that allows a user to scroll the virtual keyboard to access other keys of the virtual keyboard, while playing the virtual keyboard. Users can further benefit from a method and system for scrolling a virtual keyboard on a touch screen device that scrolls to intelligent positions based on a key of a project, and that allows a user to hold a note that is no longer in contact with a user's finger due to scrolling.

SUMMARY

Disclosed are systems, methods, and non-transitory computer-readable storage media for scrolling a virtual keyboard on a touch screen device. A first aspect musical instrument keyboard interface for a touch-sensitive electronic display is disclosed. The interface includes a module for displaying a first musical instrument keyboard on the display, wherein the keyboard contains more keys than are simultaneously visible on the display. The first interface also includes a module for detecting a user contact swipe motion in a predetermined direction along the keyboard, for scrolling the keyboard across the display in accordance with the motion, and for stopping the scrolling upon termination of user contact swipe motion.

A second aspect allows scrolling of a virtual keyboard to snap to an intelligent position based on a song key or relative minor of the song key. A third aspect allows a note to be held when a user's finger remains in contact with the display even though the finger is no longer in contact with a key linked to the note on the keyboard as a result of scrolling. A fourth aspect displays a second musical instrument keyboard adjacent to a first musical instrument keyboard, wherein the second musical instrument keyboard is linked to the first musical instrument keyboard such that scrolling of one keyboard causes automatic scrolling of the other keyboard. Many other aspects and examples will become apparent from the following disclosure.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

DETAILED DESCRIPTION

The method, system, and computer-readable medium for scrolling a keyboard on a touch screen device can be implemented on a computer. The computer can be a data-processing system suitable for storing and/or executing program code. The computer can include at least one processor that is coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data-processing systems or remote printers or storage devices through intervening private or public networks. Modems, cable modems, and Ethernet cards are just a few of the currently available types of network adapters. In one or more embodiments, the computer can be a desktop computer, laptop computer, or dedicated device.

Figure 1:
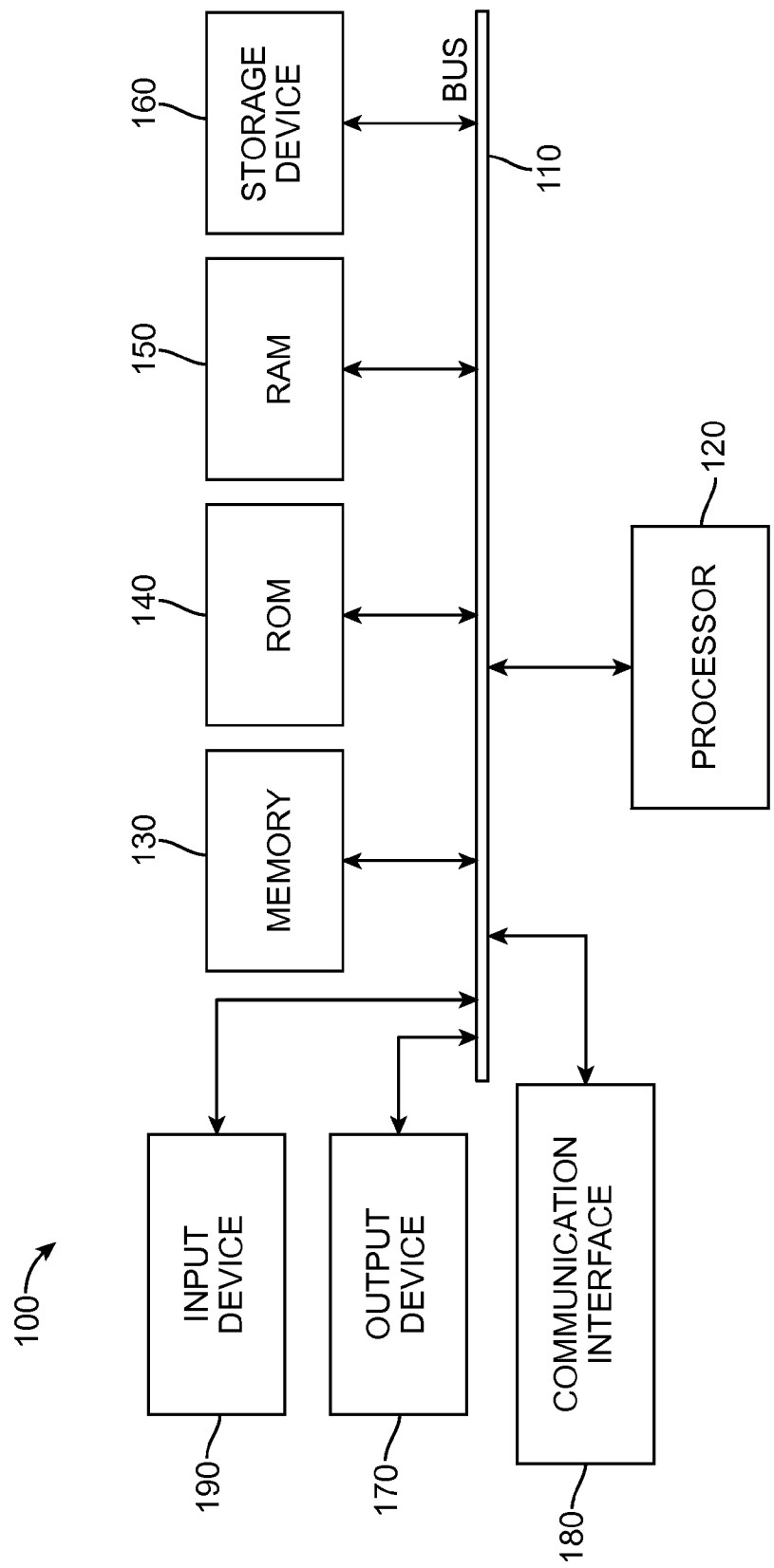
FIG. 1 illustrates hardware components associated with a system embodiment.

FIG. 1 illustrates the basic hardware components associated with the system embodiment of the disclosed technology. As shown in FIG. 1, an exemplary system includes a general-purpose computing device 100, including a processor, or processing unit (CPU) 120 and a system bus 110 that couples various system components including the system memory such as read only memory (ROM) 140 and random access memory (RAM) 150 to the processing unit 120. Other system memory 130 may be available for use as well. It will be appreciated that the invention may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer-readable media provide nonvolatile storage of computer-readable instructions, data structures, program modules and other data for the computing device 100. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer-readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms such as a touch-sensitive screen for gesture or graphical input, accelerometer, keyboard, mouse, motion input, speech and so forth. The device output 170 can also be one or more of a number of output mechanisms known to those of skill in the art, such as a display or speakers. In some instances, multi-modal systems enable a user to provide multiple types of input to communicate with the computing device 100. The communications interface 180 generally governs and manages the user input and system output. There is no restriction on the disclosed technology operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including but not limited to hardware capable of executing software. For example the functions of one or more processors shown in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The technology can take the form of an entirely hardware-based embodiment, an entirely software-based embodiment, or an embodiment containing both hardware and software elements. In one embodiment, the disclosed technology can be implemented in software, which includes but may not be limited to firmware, resident software, microcode, etc. Furthermore, the disclosed technology can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium (though propagation mediums in and of themselves as signal carriers may not be included in the definition of physical computer-readable medium). Examples of a physical computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk read only memory (CD-ROM), compact disk read/write (CD-R/W), and DVD. Both processors and program code for implementing each as aspects of the technology can be centralized and/or distributed as known to those skilled in the art.

MIDI (Musical Instrument Digital Interface) is an industry-standard protocol that enables electronic musical instruments, such as keyboard controllers, computers, and other electronic equipment, to communicate, control, and synchronize with each other. MIDI does not transmit an audio signal or media, but rather transmits "event messages" such as the pitch and intensity of musical notes to play, control signals for parameters such as volume, vibrato and panning, cues, and clock signals to set the tempo. As an electronic protocol, MIDI is notable for its widespread adoption throughout the industry.

Figure 2A:
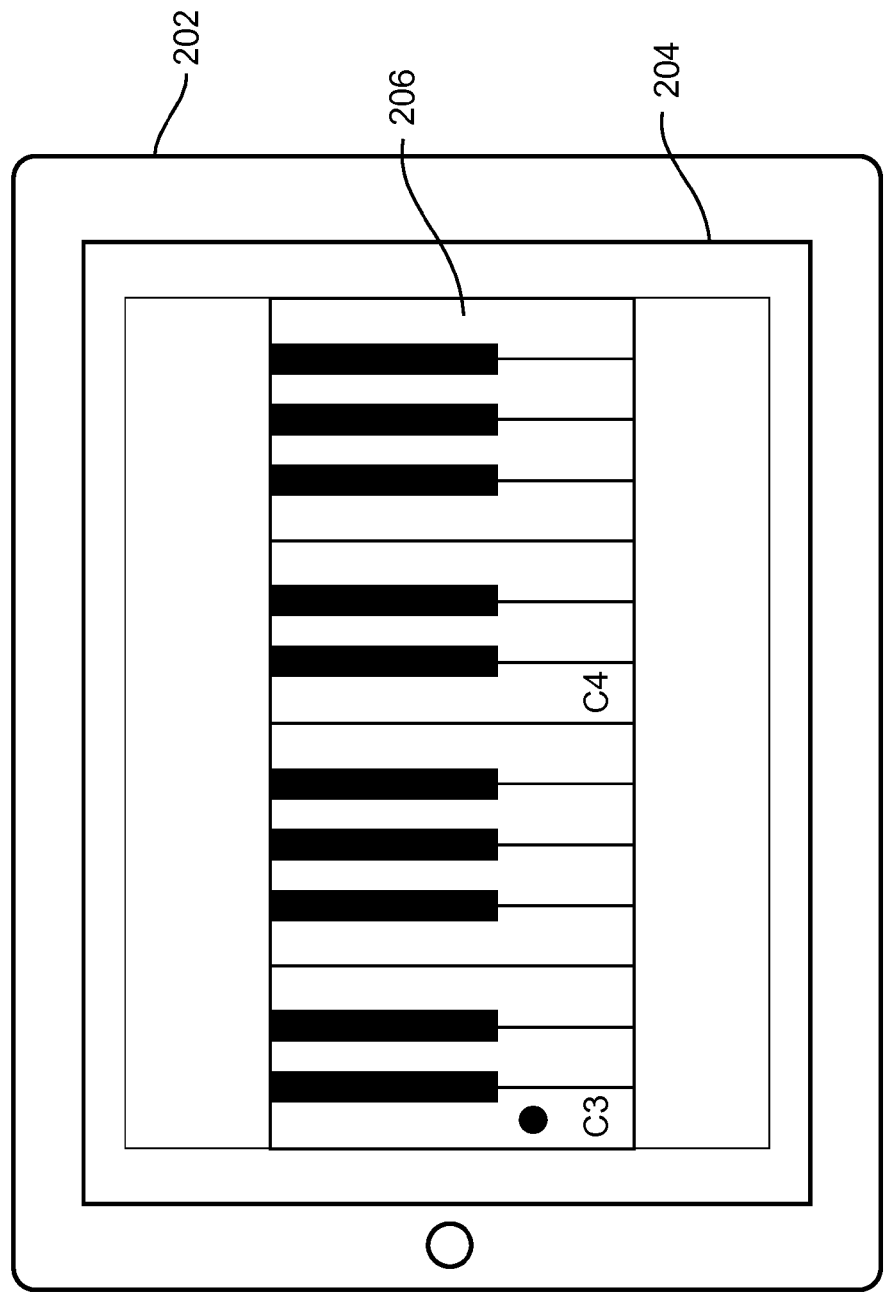
FIG. 2A illustrates a musical keyboard interface in which a keyboard is in a first position.

FIG. 2A illustrates a musical keyboard interface in which a keyboard is in a first position. FIG. 2A includes a wireless touch screen device 202. Wireless touch screen device 202 includes a touch sensitive display 204. Display 204 is displaying a musical instrument keyboard interface 206. Musical instrument keyboard interface 206 displays two octaves from C3 to B4 as shown. The instrument keyboard interface 206 contains more keys than are simultaneously visible on the display 204.

In FIG. 2A, a user has input with a finger on the display 204 over the C3 note on the musical instrument keyboard interface 206. This causes a processor to output a note corresponding to C3 on the musical instrument keyboard interface 206 to an audio output, such as speakers or headphones.

Figure 2B:
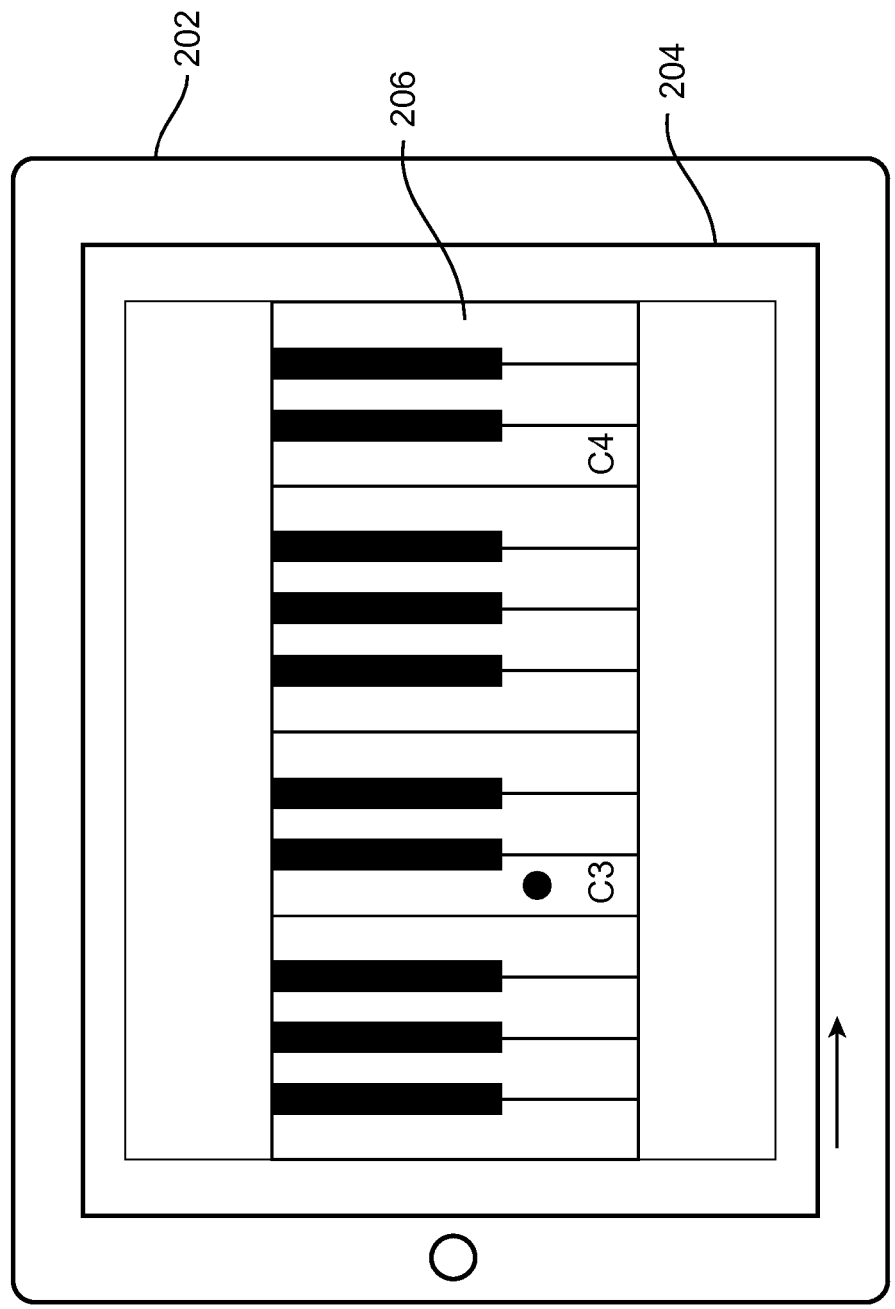
FIG. 2B illustrates the musical keyboard interface in which the keyboard is in a second position after scrolling the keyboard.

FIG. 2B illustrates the musical keyboard interface in which the keyboard interface 206 is in a second position after scrolling. In FIG. 2B, a module has detected a user contact swipe motion in a predetermined direction, such as left or right, along the keyboard and scrolled the keyboard across the display in accordance with the motion, and stopped the scrolling upon termination of the user contact swipe motion. By causing the scrolling of the musical keyboard interface to the right as shown in FIG. 2A to FIG. 2B, the user is able to access more notes on the musical keyboard interface. More specifically, the user is now able to access notes F2 to B2. Advantageously, the user is able to access these notes while still playing note C3.

Figure 3A:
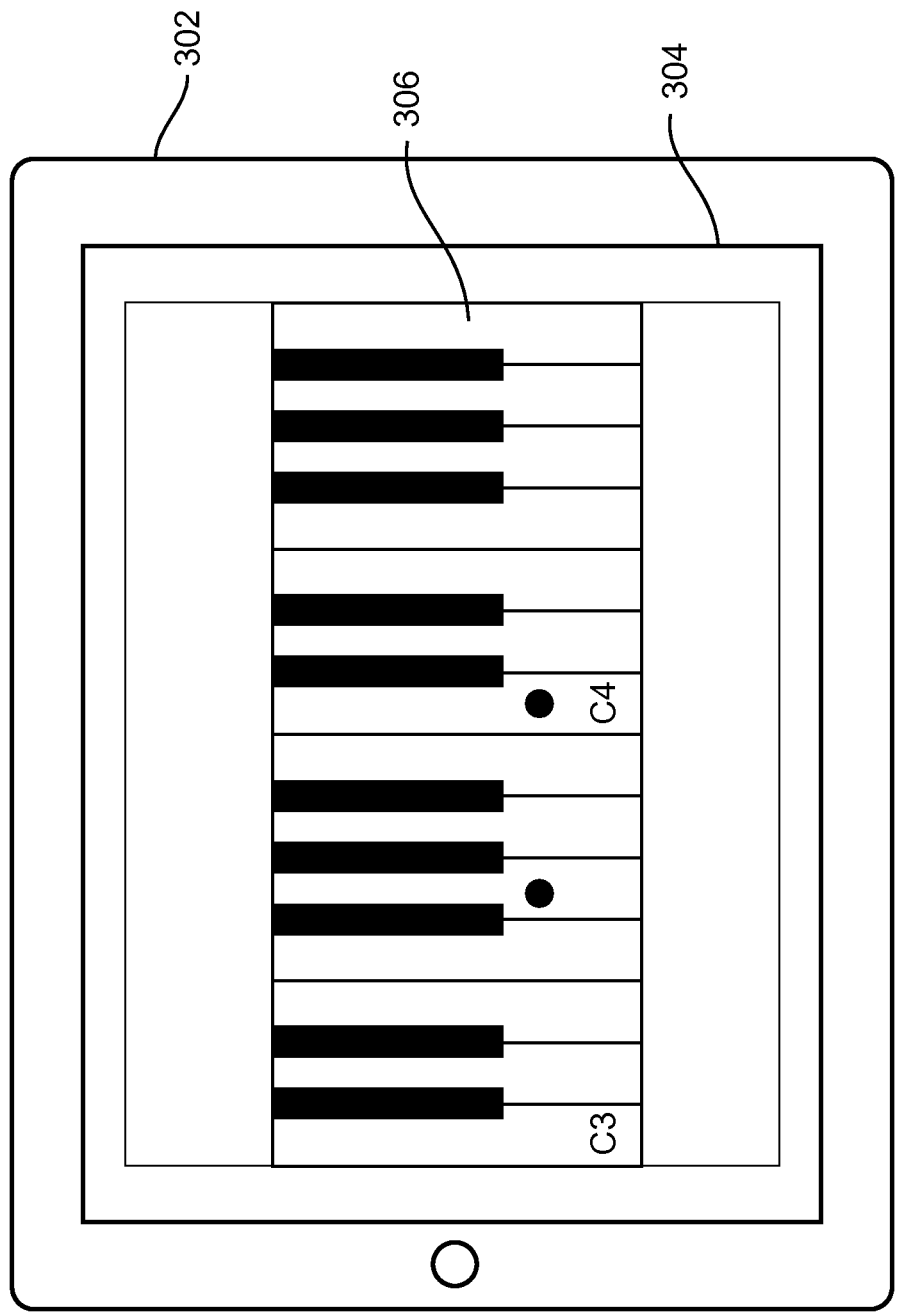
FIG. 3A illustrates a musical keyboard interface in which a keyboard is in a first position.

FIG. 3A illustrates a musical keyboard interface in which a keyboard is in a first position. FIG. 3A includes a wireless touch screen device 302. Wireless touch screen device 302, includes a touch sensitive display 304. Display 304 is displaying a musical instrument keyboard interface 306. Musical instrument keyboard interface 306 displays two octaves from C3 to B4 as shown. The instrument keyboard interface 306 contains more keys than are simultaneously visible on the display 304.

In FIG. 3A, a user has input with a finger on the display 304 over a C4 note on the musical instrument keyboard interface 306. The user has also input with a second finger on the display 304 over a G3 note on the musical instrument keyboard interface 306. This causes a processor to output a first note corresponding to C4 and a second note corresponding to G3 on the musical instrument keyboard interface 306 to an audio output, such as speakers or headphones.

Figure 3B:
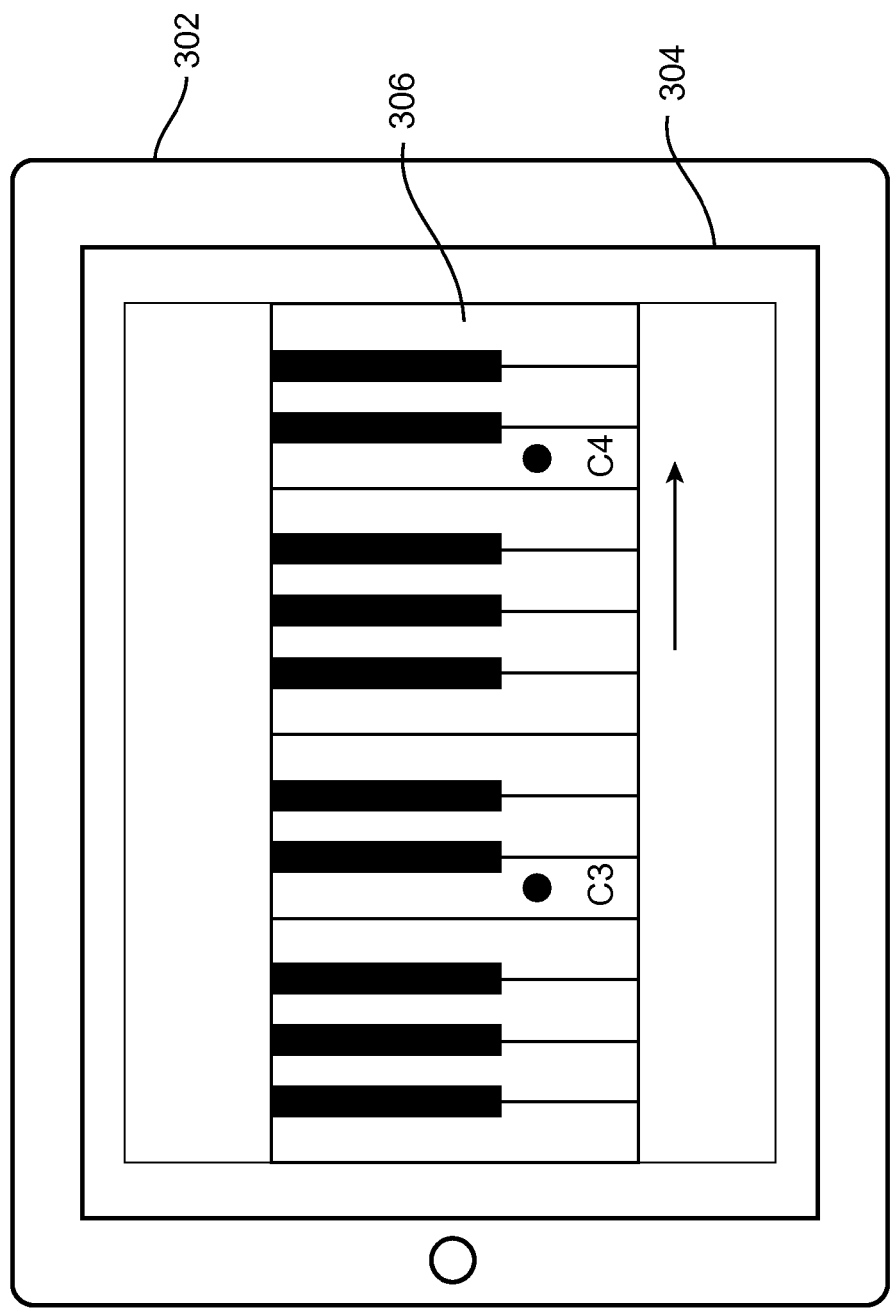
FIG. 3B illustrates the musical keyboard interface in which a note is held when a user's finger remains in contact with the display and the finger is no longer in contact with a key linked to the note on the keyboard as a result of scrolling.

FIG. 3B illustrates the musical keyboard interface in which a note is held when a user's finger remains in contact with the display and the finger is no longer in contact with a key linked to the note on the keyboard as a result of scrolling.

In FIG. 3B, a module has detected a user contact swipe motion with respect to the first note in a predetermined direction, such as left or right, along the keyboard and scrolled the keyboard across the display in accordance with the motion, and stopped the scrolling upon termination of the user contact swipe motion. In FIG. 3B, the user has held the second finger on the display 304 on the musical instrument keyboard interface 306 at its original position. The second note G3 will continue to be played and output while, as a result of scrolling, it is no longer in contact with the user's second finger. In this embodiment the second note G3 will continue to play as long as the user's second finger is in contact with its original position on display 304.

By causing the scrolling of the musical keyboard interface to the right as shown in FIG. 3A to FIG. 3B, the user is able to access more notes on the musical keyboard interface, while still playing second note G3 that is no longer in contact with the second finger. More specifically, the user is now able to access notes F2 to B2. Advantageously, the user is able to access these notes while still playing notes C4 and G3.

Figure 4A:
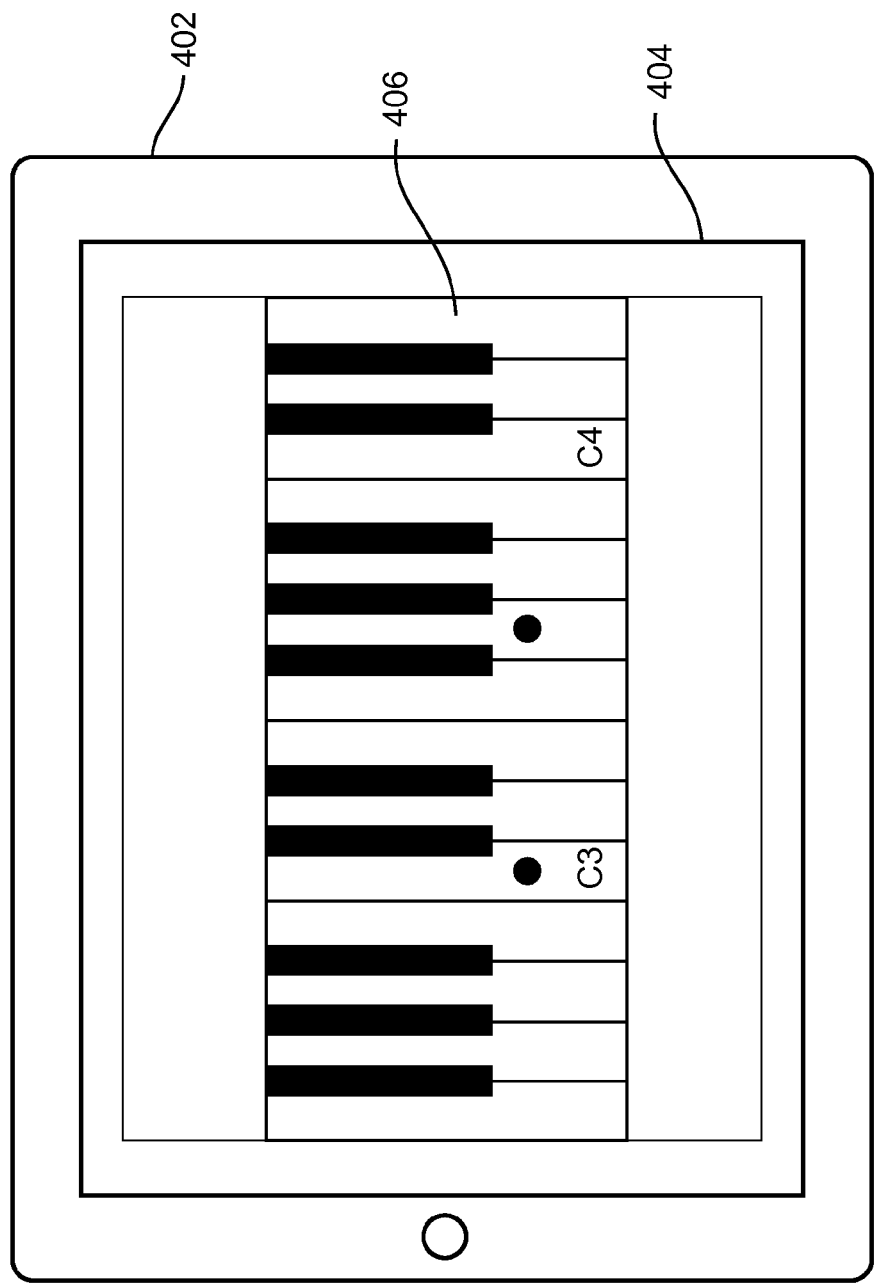
FIG. 4A illustrates a musical keyboard interface in which a keyboard is in a first position.

FIG. 4A illustrates a musical keyboard interface in which a keyboard is in a first position. FIG. 4A includes a wireless touch screen device 402. Wireless touch screen device 402, includes a touch sensitive display 404. Display 404 is displaying a musical instrument keyboard interface 406. Musical instrument keyboard interface 406 displays two octaves from F2 to B4 as shown. The instrument keyboard interface 406 contains more keys than are simultaneously visible on the display 404.

In FIG. 4A, a user has input with a first finger on the display 304 over a C3 note on the musical instrument keyboard interface 306. The user has also input with a second finger on the display 304 over a G3 note on the musical instrument keyboard interface 306. This causes a processor to output a first note corresponding to C3 and a second note corresponding to G3 on the musical instrument keyboard interface 406 to an audio output, such as speakers or headphones.

Figure 4B:
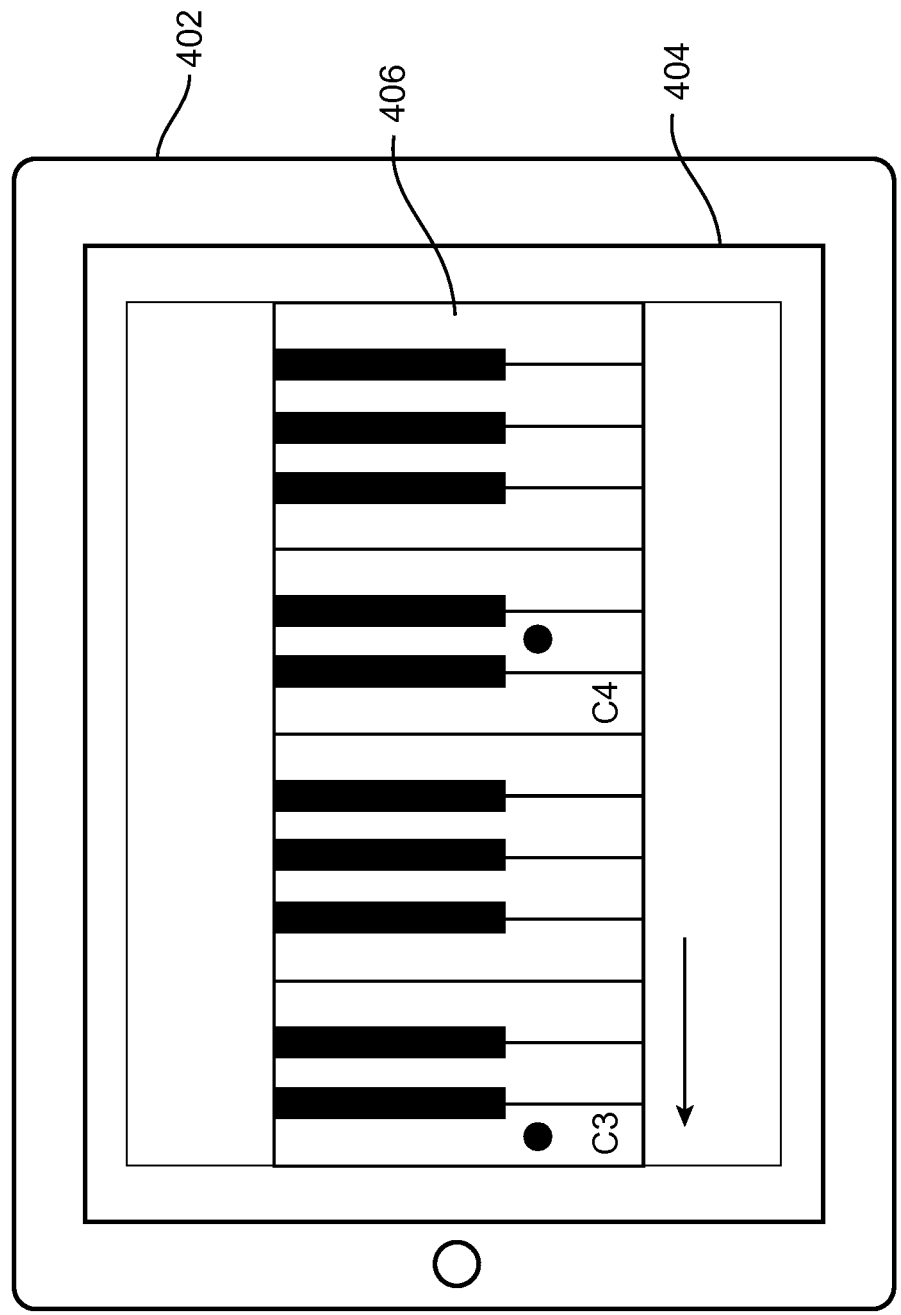
FIG. 4B illustrates the musical keyboard interface in which a note is held when a user's finger remains in contact with the display and the finger is no longer in contact with a key linked to the note on the keyboard as a result of scrolling.

FIG. 4B illustrates the musical keyboard interface in which a note is held when a user's finger remains in contact with the display and the finger is no longer in contact with a key linked to the note on the keyboard as a result of scrolling.

In FIG. 4B, a module has detected a user contact swipe motion with respect to the first note in a predetermined direction, such as left or right, along the keyboard and scrolled the keyboard across the display in accordance with the motion, and stopped the scrolling upon termination of the user contact swipe motion. In FIG. 4B, the user has held the second finger on the display 404 on the musical instrument keyboard interface 406 at its original position. The second note G3 will continue to be played and output while, as a result of scrolling, it is no longer in contact with the user's second finger. In this embodiment the second note G3 will continue to play as long as the user's second finger is in contact with its original position on display 404.

By causing the scrolling of the musical keyboard interface to the left as shown in FIG. 4A to FIG. 4B, the user is able to access more notes on the musical keyboard interface, while still playing second note G3 that is no longer in contact with the second finger. More specifically, the user is now able to access notes F4 to B4. Advantageously, the user is able to access these notes while still playing notes C3 and G3.

Figure 5A:
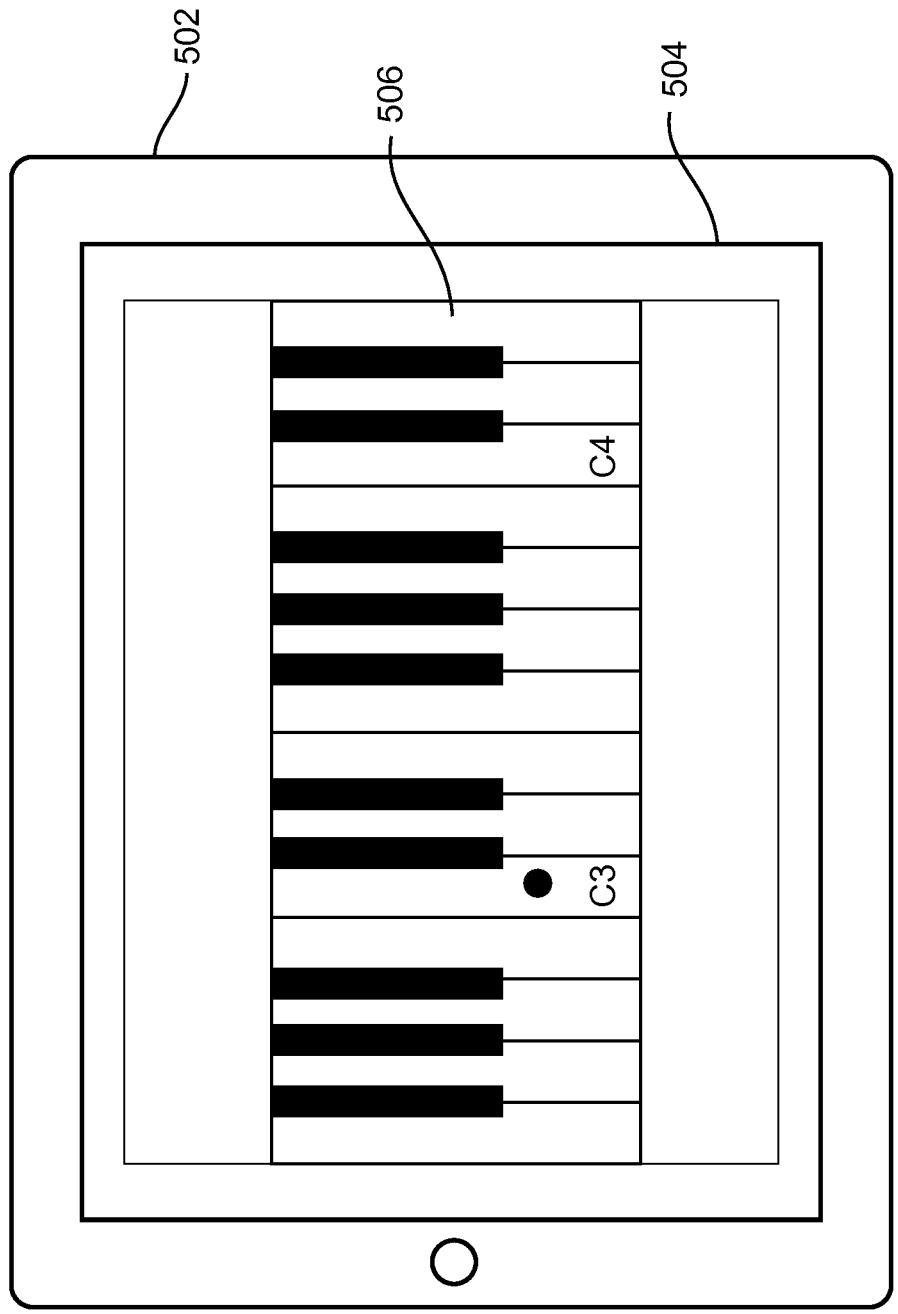
FIG. 5A illustrates a musical keyboard interface in which a keyboard is in a first position.

FIG. 5A illustrates a musical keyboard interface in which a keyboard is in a first position. FIG. 5A includes a wireless touch screen device 502. Wireless touch screen device 502, includes a touch sensitive display 504. Display 504 is displaying a musical instrument keyboard interface 506. Musical instrument keyboard interface 506 displays two octaves from F2 to E4 as shown. The instrument keyboard interface 506 contains more keys than are simultaneously visible on the display 504.

In FIG. 5A, a user has input with a finger on the display 504 over a C3 note on the musical instrument keyboard interface 506. This causes a processor to output a note corresponding to C3 on the musical instrument keyboard interface 506 to an audio output, such as speakers or headphones.

Figure 5B:
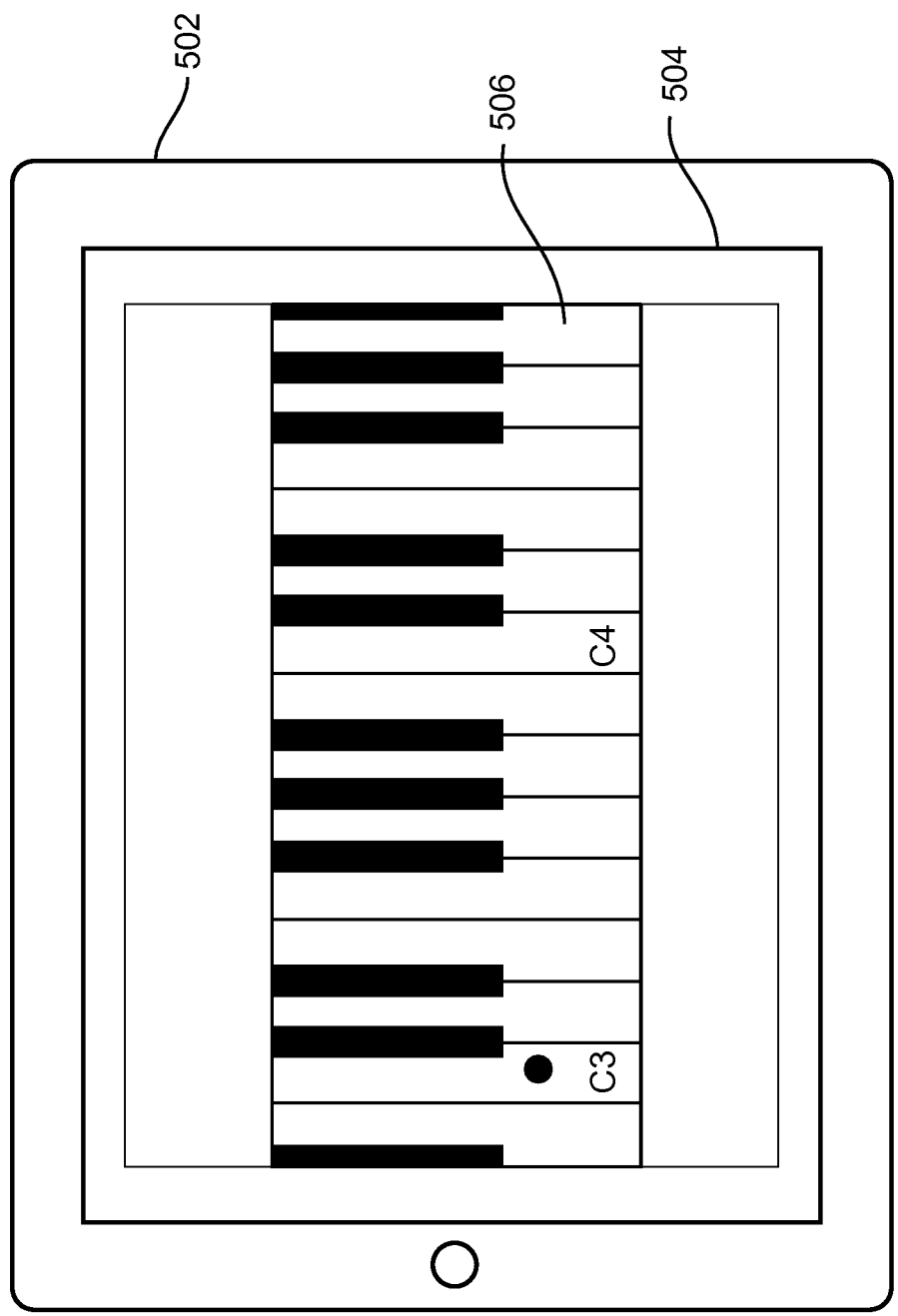
FIG. 5B illustrates the musical keyboard interface in which the keyboard is in a second position after scrolling the keyboard.

FIG. 5B illustrates the musical keyboard interface in which the keyboard interface 506 is in a second position after scrolling. In FIG. 5B, a module has detected a user contact swipe motion in a predetermined direction, such as left or right, along the keyboard and scrolled the keyboard across the display in accordance with the motion, and stopped the scrolling upon termination of the user contact swipe motion. By causing the scrolling of the musical keyboard interface to the right as shown in FIG. 5A to FIG. 5B, the user is able to access more notes on the musical keyboard interface. More specifically, the user is now able to access notes F4 to A#4. Advantageously, the user is able to access these notes while still playing note C3.

Figure 5C:
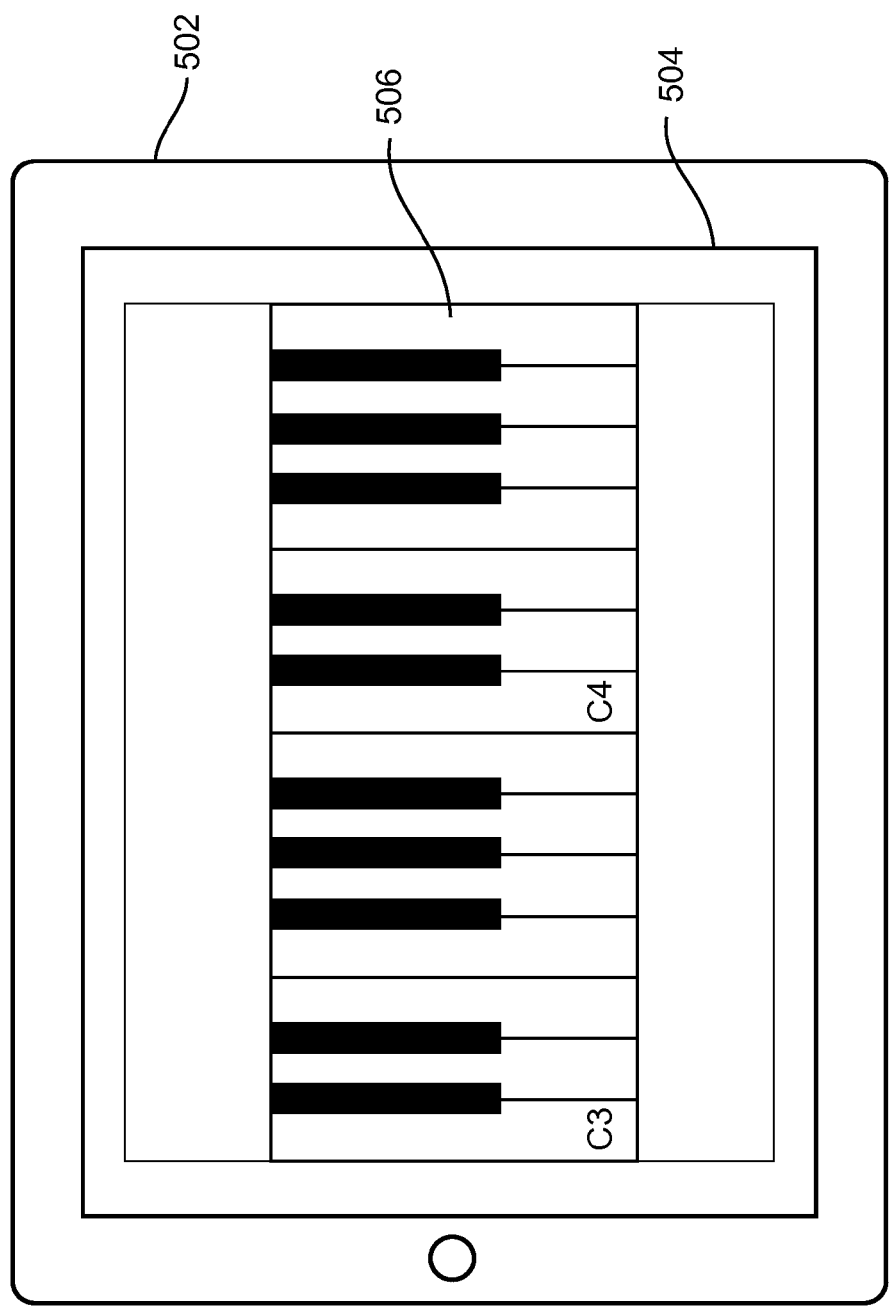
FIG. 5C illustrates the musical keyboard interface in which the keyboard is in a third position after scrolling the keyboard, in which the keyboard is aligned based on an input musical key.

FIG. 5C illustrates the musical keyboard interface 506 in which the keyboard is in a third position after scrolling the keyboard. Furthermore, the keyboard is aligned based on an input musical key. In FIG. 5C, a module for receiving user input as to a musical key has received a user input that the musical key is C for this arrangement. Also, in FIG. 5C, a module has aligned the keyboard 506 on the display 504 such that an end key visible on an end of the keyboard 506 is related to the musical key input after stopping the scrolling. In this example, the module aligned the keyboard 506 on display 504 such that the C3 is in the left most position for keyboard 506. In this example, the module aligned the keyboard 506 in this manner because the C3 key was a predetermined distance from an edge of the display 504 upon termination of user contact swipe motion. This alignment allows a keyboard key corresponding to a key of a song input by a user to "snap to" the left most position of keyboard 506 after a user swipe if the keyboard key corresponding to the key of the song is within a predetermined distance from the left most position of keyboard 506.

Figure 6A:
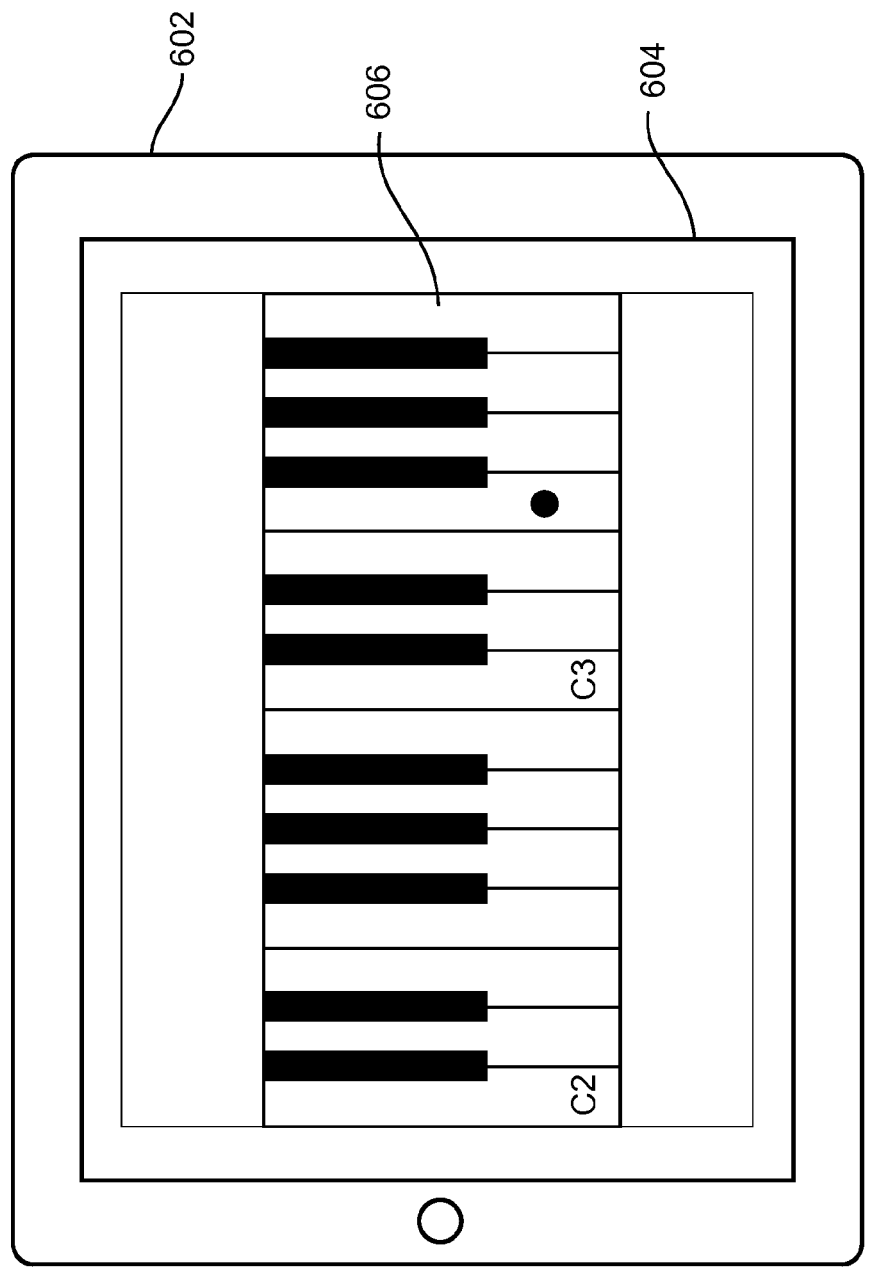
FIG. 6A illustrates the musical keyboard interface in which a keyboard is in a first position.

FIG. 6A illustrates a musical keyboard interface in which a keyboard is in a first position. FIG. 6A includes a wireless touch screen device 602. Wireless touch screen device 602, includes a touch sensitive display 604. Display 604 is displaying a musical instrument keyboard interface 606. Musical instrument keyboard interface 606 displays two octaves from C3 to B4 as shown. The instrument keyboard interface 606 contains more keys than are simultaneously visible on the display 604.

In FIG. 6A, a user has input with a finger on the display 604 over a F3 note on the musical instrument keyboard interface 606. This causes a processor to output a note corresponding to F3 on the musical instrument keyboard interface 606 to an audio output, such as speakers or headphones.

Figure 6B:
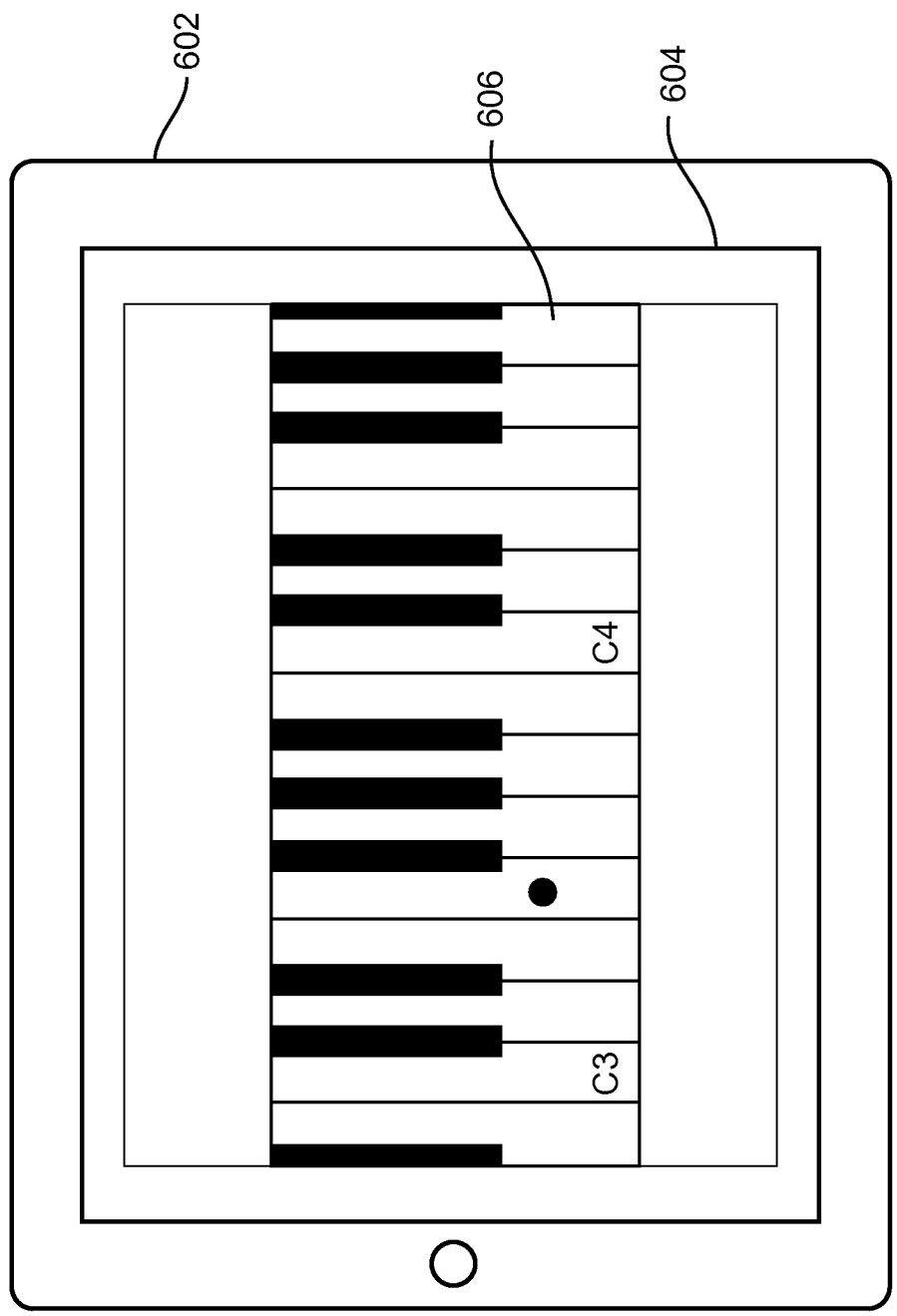
FIG. 6B illustrates the musical keyboard interface in which the keyboard is in a second position after scrolling the keyboard.

FIG. 6B illustrates the musical keyboard interface in which the keyboard interface 606 is in a second position after scrolling. In FIG. 6B, a module has detected a user contact swipe motion in a predetermined direction, such as left or right, along the keyboard and scrolled the keyboard across the display in accordance with the motion, and stopped the scrolling upon termination of the user contact swipe motion. By causing the scrolling of the musical keyboard interface to the left as shown in FIG. 6A to FIG. 6B, the user is able to access more notes on the musical keyboard interface. More specifically, the user is now able to access notes C4 to A#4. Advantageously, the user is able to access these notes while still playing note F3.

Figure 6C:
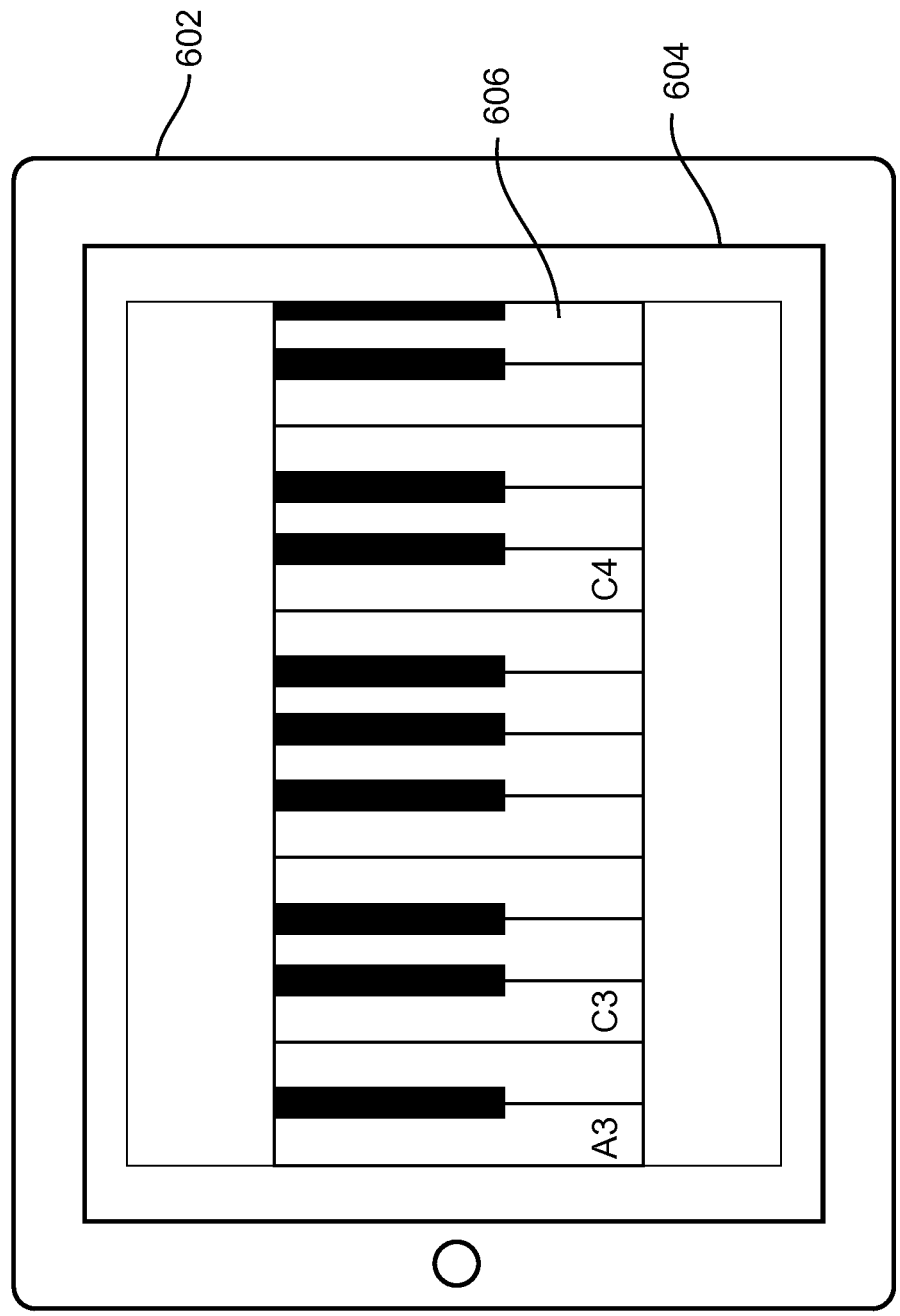
FIG. 6C illustrates the musical keyboard interface in which the keyboard is in a third position after scrolling the keyboard, in which the keyboard is aligned based on the relative minor of an input musical key.

FIG. 6C illustrates the musical keyboard interface 606 in which the keyboard is in a third position after scrolling the keyboard. Furthermore, the keyboard is aligned based on a relative minor of an input musical key. In FIG. 6C, a module for receiving user input as to a musical key has received a user input that the musical key is C for this arrangement. The minor key of C is A. Also, in FIG. 6C, a module has aligned the keyboard 606 on the display 604 such that an end key visible on an end of the keyboard 606 is related to the relative minor of musical key input after stopping the scrolling. In this example, the module aligned the keyboard 606 on display 604 such that the A2 is in the left most position for keyboard 606. In this example, the module aligned the keyboard 606 in this manner because the A2 key was a predetermined distance from an edge of the display 604 upon termination of user contact swipe motion. This alignment allows a keyboard key corresponding to a relative minor of a key of a song input by a user to "snap to" the left most position of keyboard 606 after a user swipe if the keyboard key corresponding to the key of the song is within a predetermined distance from the left most position of keyboard 606.

Figure 7:
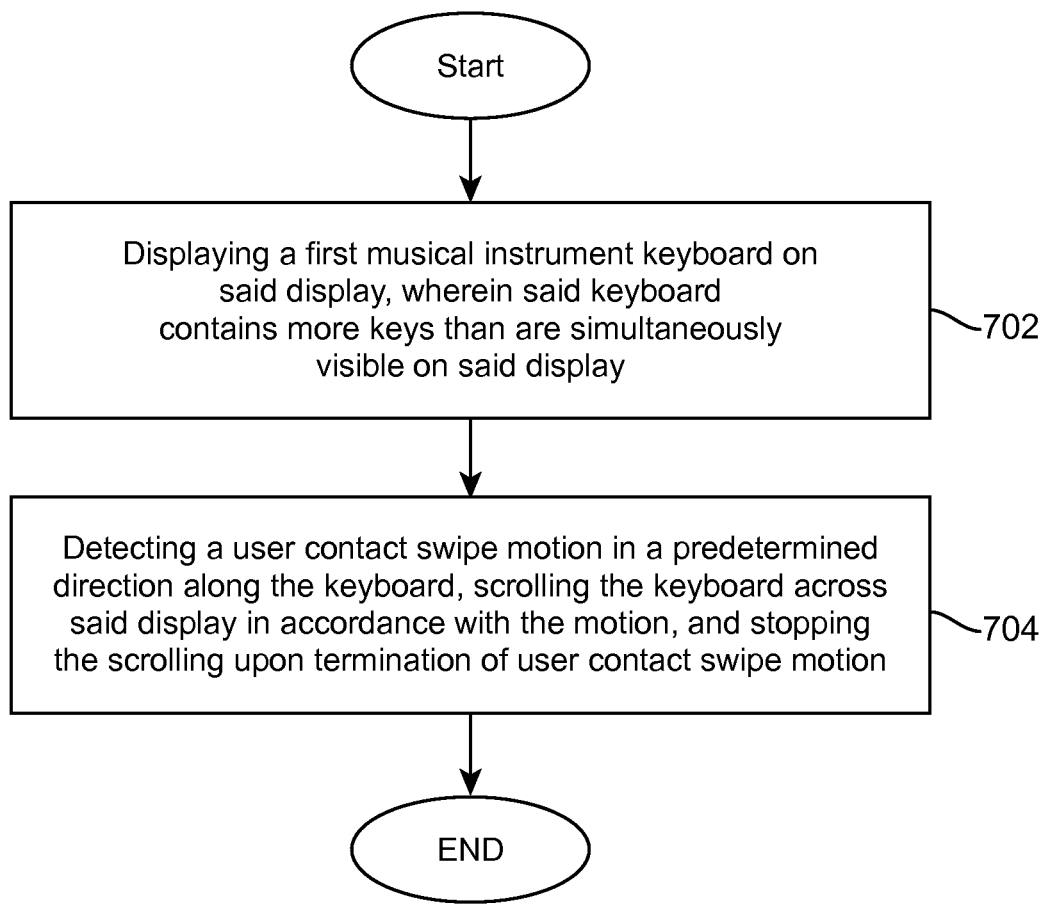
FIG. 7 is a flowchart for detecting a user contact swipe motion in a predetermined direction, scrolling a virtual keyboard, and for stopping the scrolling upon termination of user contact swipe motion.

FIG. 7 is a flowchart for detecting a user contact swipe motion in a predetermined direction, scrolling a virtual keyboard, and stopping the scrolling upon termination of user contact swipe motion. As shown in FIG. 7, block 702 includes displaying a first musical instrument keyboard on the display, wherein the keyboard contains more keys than are simultaneously visible on the display. Block 704 includes detecting a user contact swipe motion in a predetermined direction along the keyboard, scrolling the keyboard across the display in accordance with the motion, and stopping the scrolling upon termination of user contact swipe motion.

Figure 8:
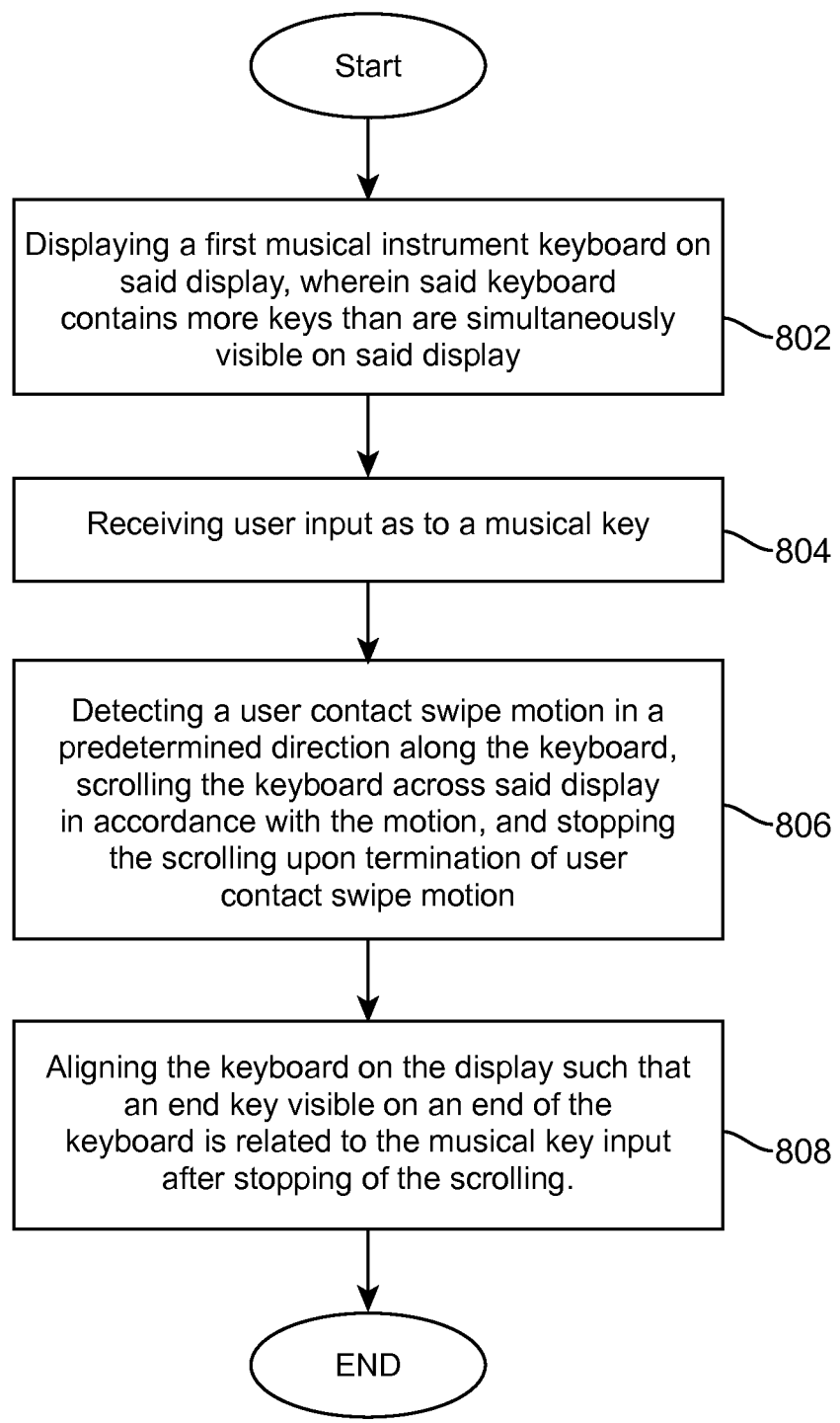
FIG. 8 is a flowchart for scrolling of a virtual keyboard to snap to an intelligent position based on a song key or relative minor of the song key.

FIG. 8 is a flowchart for scrolling of a virtual keyboard to snap to an intelligent position based on a song key or relative minor of the song key. Block 802 includes a displaying a first musical instrument keyboard on the display, wherein the keyboard contains more keys than are simultaneously visible on the display. Block 804 includes receiving user input as to a musical key. Block 806 includes detecting a user contact swipe motion in a predetermined direction along the keyboard, scrolling the keyboard across the display in accordance with the motion, and stopping the scrolling upon termination of user contact swipe motion. Block 808 includes aligning the keyboard on the display such that an end key visible on an end of the keyboard is related to the musical key input after stopping of the scrolling.

In one example, the aligning the keyboard includes aligning the end key based on a predetermined distance of the end key from an edge of the display upon termination of user contact swipe motion.

In one example, the predetermined distance is from an edge of the display to a visible portion of the keyboard. In another example, the predetermined distance is from an edge of the display to a non-visible portion of the keyboard.

In one example, the end key is a base note of the musical key. In another example, the end key is a base note of the relative minor of the musical key.

Another example includes a hold note zone on the display to which a user may drag a first note being played on the keyboard, such that the first note continues to be played after it is no longer visible on the keyboard as a result of scrolling. This example includes further includes an embodiment including allowing a second note to be played by contacting a visible key on the keyboard while the first note continues to be played.

Another example includes displaying a second musical instrument keyboard adjacent to the first musical instrument keyboard, wherein the second musical instrument keyboard is linked to the first musical instrument keyboard such that scrolling of one keyboard causes automatic scrolling of the other keyboard.

Figure 9:
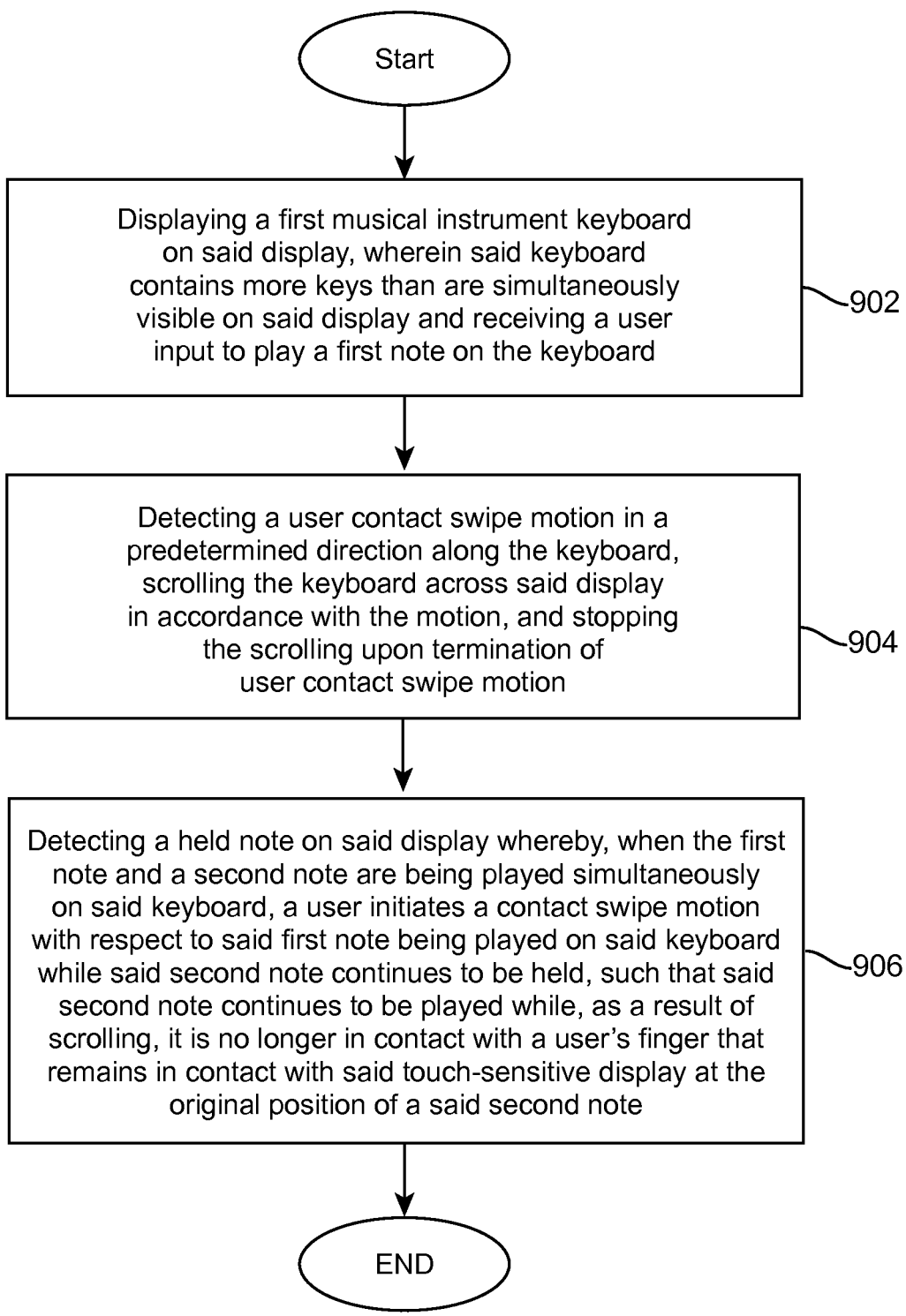
FIG. 9 is a flowchart for playing a held note.

FIG. 9 is a flowchart for playing a held note when a user's finger remains in contact with the display and the finger is no longer in contact with a key linked to the note on the keyboard as a result of scrolling. Block 902 includes displaying a first musical instrument keyboard on the display, wherein the keyboard contains more keys than are simultaneously visible on the display. Block 904 includes detecting a user contact swipe motion in a predetermined direction along the keyboard, and scrolling the keyboard across the display in accordance with the motion, and stopping the scrolling upon termination of user contact swipe motion. Block 906 includes detecting a held note on the display whereby, when a first note and a second note are being played simultaneously on the keyboard, a user initiates a contact swipe motion with respect to the first note being played on the keyboard while the second note continues to be held, such that the second note continues to be played while, as a result of scrolling, it is no longer in contact with a user's finger that remains in contact with the touch-sensitive display at the original position of the second note. An example includes playing a third note in response to a user contacting a visible key on said keyboard while said second note continues to be played.

Figure 10:
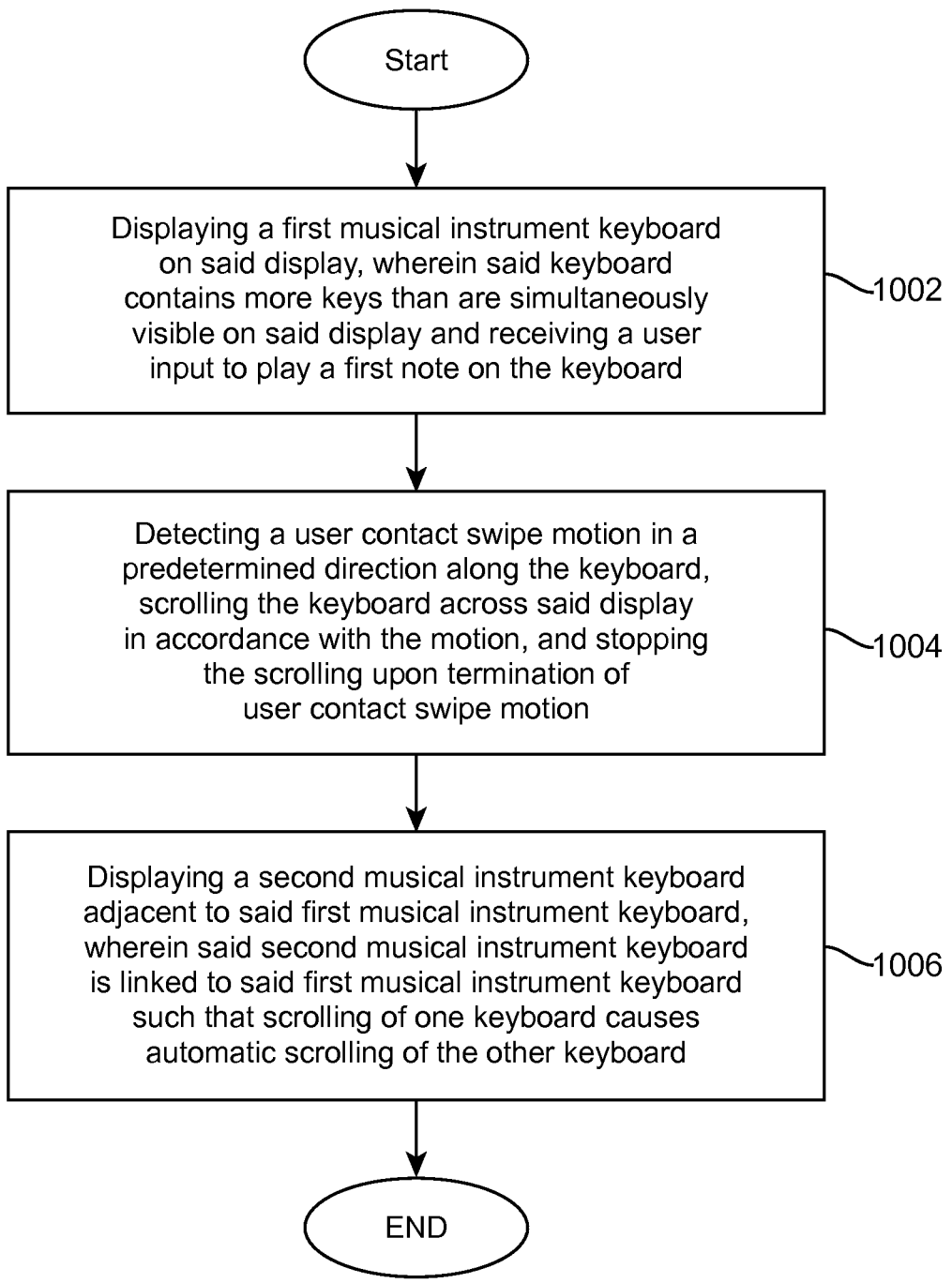
FIG. 10 is a flowchart for displaying a first and second virtual keyboard on a touch screen device, wherein the first and second virtual keyboards are linked.

FIG. 10 is a flowchart for displaying a first and second virtual keyboard on a touch screen device, wherein the first and second virtual keyboards are linked.

Block 1002 includes displaying a first musical instrument keyboard on the display, wherein the keyboard contains more keys than are simultaneously visible on the display. Block 1004 includes detecting a user contact swipe motion in a predetermined direction along the keyboard, and scrolling the keyboard across the display in accordance with the motion, and stopping the scrolling upon termination of user contact swipe motion. Block 1006 includes displaying a second musical instrument keyboard adjacent to the first musical instrument keyboard, wherein the second musical instrument keyboard is linked to the first musical instrument keyboard such that scrolling of one keyboard causes automatic scrolling of the other keyboard.

Figure 11:
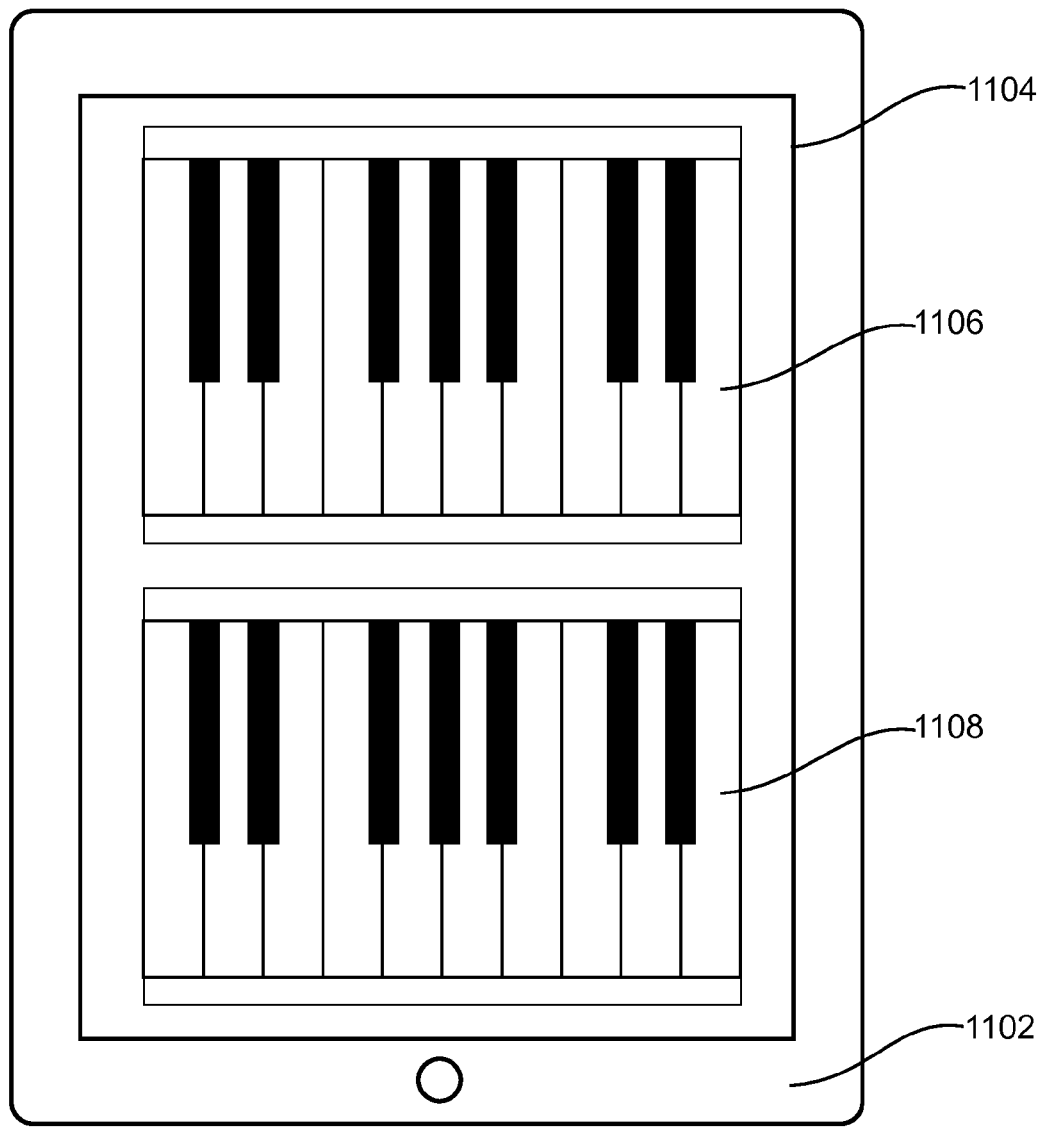
FIG. 11 illustrates a first and second musical keyboard interface on a single device.

FIG. 11 illustrates a first and second musical keyboard interface on a single device. FIG. 11 includes a wireless touch screen device 1102. Wireless touch screen device 1102 includes a touch sensitive display 1104. Display 1104 is displaying a first musical instrument keyboard interface 1106 and a second musical instrument keyboard interface 1108. The first instrument keyboard interface 1106 and second musical instrument keyboard interface 1108 contain more keys than are simultaneously visible on the display 1104.

In one embodiment, the first instrument keyboard interface 1106 is linked to the second musical instrument keyboard interface 1108, such that scrolling of the first interface 1106 by a user causes automatic scrolling of the second interface 1108. In another example, scrolling of the second interface by the user 1108 causes automatic scrolling of first interface 1106. In one example, the automatic scrolling is in the same direction, such as left or right, of the scrolling of the other interface. In another example, the automatic scrolling is the opposite direction, of the scrolling of the other interface.

In another embodiment, the first instrument keyboard interface 1106 is not linked to the second musical instrument keyboard interface 1108.

Displaying multiple keyboard interfaces capable of scrolling advantageously allows a user to use an upper keyboard interface for a desired sound such as a lead synthesizer sound and a lower keyboard interface for a desired sound such as a bass sound. Using a traditional keyboard, a user can split an 88-key keyboard such that, for the lower 44 keys play a bass instrument and the upper 44 keys play a lead instrument. However, displaying multiple keyboard interfaces capable of scrolling advantageously allow a user to access all 88 keys of the upper keyboard lead synthesizer and 88 keys of the lower keyboard bass synthesizer.

Figure 12:
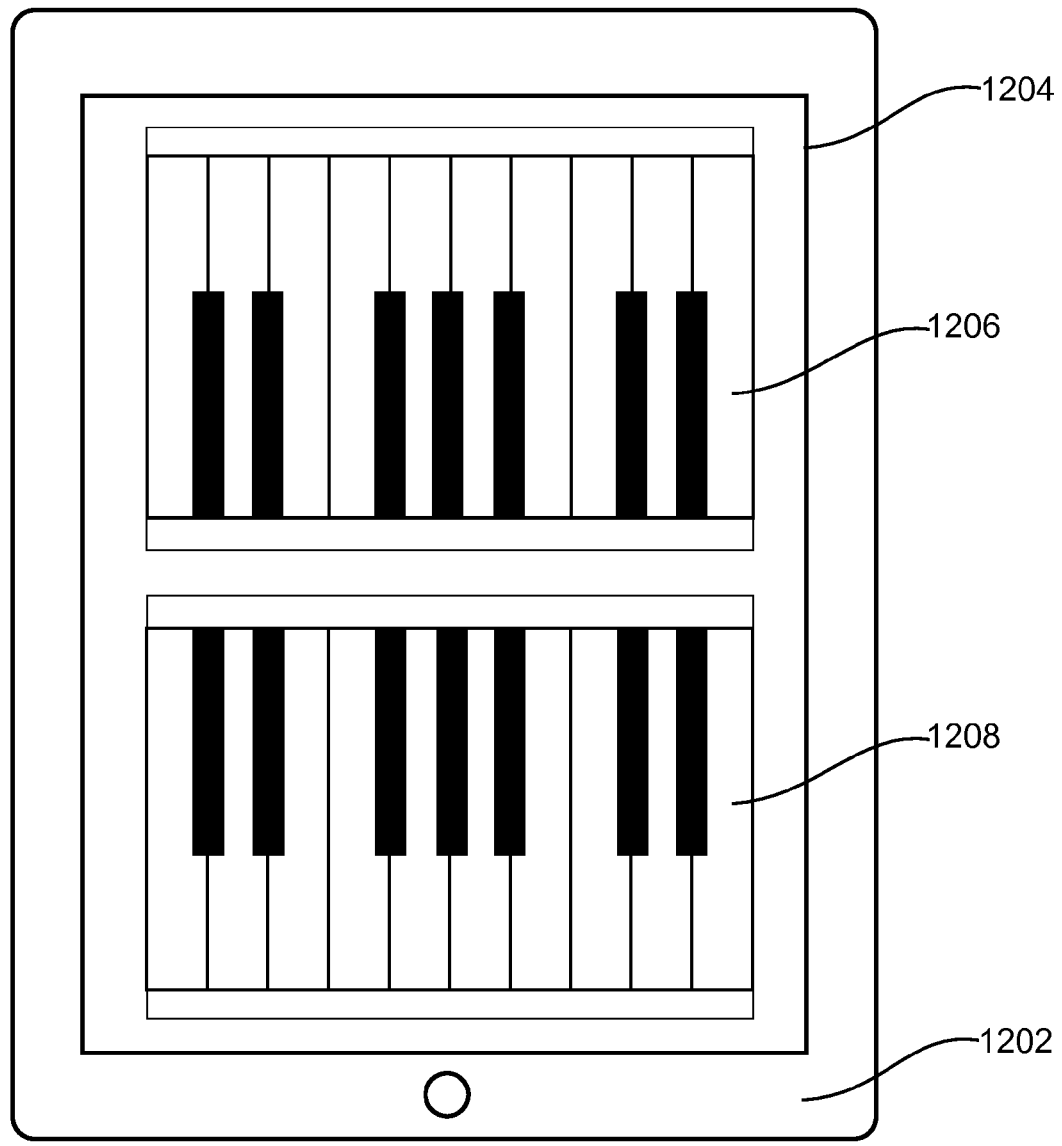
FIG. 12 illustrates another embodiment of a first and second musical keyboard interface on a single device.

FIG. 12 illustrates a first and second musical keyboard interface on a single device in what can be referred to as a "duel" mode. FIG. 12 includes a wireless touch screen device 1202. Wireless touch screen device 1202 includes a touch sensitive display 1204. Display 1204 is displaying a first musical instrument keyboard interface 1206 and a second musical instrument keyboard interface 1208. The first instrument keyboard interface 1206 and second musical instrument keyboard interface 1208 contain more keys than are simultaneously visible on the display 1204.

In one embodiment as shown in FIG. 12, display 1204 presents first musical instrument keyboard interface 1206 and a second musical instrument keyboard interface 1208 in such a way that two users can each play one of the keyboard interfaces to simulate a "piano duel" setup. Those of skill in the art will recognize other configurations of two musical instrument keyboard interfaces on a single display.

Embodiments within the scope of the present disclosure may also include tangible and/or non-transitory computer-readable storage media for carrying or having computer executable instructions or data structures stored thereon. Such non-transitory computer readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The above disclosure provides examples within the scope of claims, appended hereto or later added in accordance with applicable law. However, these examples are not limiting as to how any disclosed embodiments may be implemented, as those of ordinary skill can apply these disclosures to particular situations in a variety of ways.

The invention claimed is:

1. A system for presenting a musical instrument keyboard interface on a touch-sensitive electronic display, the system comprising:
one or more processors; and
a computer-readable medium including instructions which, when executed by the one or more processors, causes:
displaying a first musical instrument keyboard on said display, wherein said keyboard contains more keys than are simultaneously visible on said display;
receiving user input as to a musical key;
detecting a user contact swipe motion in a predetermined direction along said keyboard, for scrolling said keyboard across said display in accordance with said motion, and for stopping said scrolling upon termination of user contact swipe motion; and
aligning said keyboard on said display such that an end key visible on an end of said keyboard is related to said musical key input after stopping of said scrolling, wherein said aligning module aligns said end key based on a predetermined distance of said end key from an edge of said display upon termination of user contact swipe motion.

2. The system as claimed in claim 1, wherein said predetermined distance is from an edge of said display to a visible portion of said keyboard.

3. The system as claimed in claim 1, wherein said predetermined distance is from an edge of said display to a non-visible portion of said keyboard.

4. The system as claimed in claim 1, wherein said end key is a base note of said musical key.

5. The system as claimed in claim 1, wherein said end key is a base note of the relative minor of said musical key.

6. The system as claimed in claim 1, wherein the instructions cause for detecting a held note on said display whereby, when a first note and a second note are being played simultaneously on said keyboard, a user may initiate a contact swipe motion with respect to said first note being played on said keyboard while said second note continues to be held, such that said second note continues to be played while, as a result of scrolling, it is no longer in contact with a user's finger that remains in contact with said touch-sensitive display at the original position of said second note.

7. The system as claimed in claim 6, wherein the instructions cause a third note to be played by a user contacting a visible key on said keyboard while said second note continues to be played.

8. The system as claimed in claim 1, wherein the instructions cause a second musical instrument keyboard to be displayed adjacent to said first musical instrument keyboard, wherein said second musical instrument keyboard is linked to said first musical instrument keyboard such that scrolling of one keyboard causes automatic scrolling of the other keyboard.

9. A method implemented on a computer system, comprising:
displaying a first musical instrument keyboard on a display, wherein said keyboard contains more keys than are simultaneously visible on said display;
receiving user input as to a musical key;
detecting a user contact swipe motion in a predetermined direction along said keyboard, scrolling said keyboard across said display in accordance with said motion, and stopping said scrolling upon termination of user contact swipe motion; and
aligning said keyboard on said display such that an end key visible on an end of said keyboard is related to said musical key input after stopping of said scrolling, wherein said aligning module aligns said end key based on a predetermined distance of said end key from an edge of said display upon termination of user contact swipe motion.

10. The method of claim 9, wherein said predetermined distance is from an edge of said display to a visible portion of said keyboard.

11. The method of claim 9, wherein said predetermined distance is from an edge of said display to a non-visible portion of said keyboard.

12. The method of claim 9, wherein said end key is a base note of said musical key.

13. The method of claim 9, wherein said end key is a base note of the relative minor of said musical key.

14. A method implemented on a computer system, comprising:
displaying a first musical instrument keyboard on a display, wherein said keyboard contains more keys than are simultaneously visible on said display; and
detecting a user contact swipe motion in a predetermined direction along said keyboard, scrolling said keyboard across said display in accordance with said motion, and stopping said scrolling upon termination of user contact swipe motion; and
detecting a held note on said display whereby, when a first note and a second note are being played simultaneously on said keyboard, a user initiates a contact swipe motion with respect to said first note being played on said keyboard while said second note continues to be held, such that said second note continues to be played while, as a result of scrolling, it is no longer in contact with a user's finger that remains in contact with said touch-sensitive display at the original position of said second note.

15. The method of claim 14, further comprising playing a third note in response to a user contacting a visible key on said keyboard while said second note continues to be played.

16. A computer program product comprising a plurality of computer executable instructions tangibly embodied in a physical media, said instructions causing a computer to:
display a first musical instrument keyboard on said display, wherein said keyboard contains more keys than are simultaneously visible on said display;
receive user input as to a musical key;
detect a user contact swipe motion in a predetermined direction along said keyboard, scrolling said keyboard across said display in accordance with said motion, and stop said scrolling upon termination of user contact swipe motion; and
align said keyboard on said display such that an end key visible on an end of said keyboard is related to said musical key input after stopping of said scrolling, wherein said instructions to align said keyboard align said end key based on a predetermined distance of said end key from an edge of said display upon termination of user contact swipe motion.

17. The computer program product of claim 16, wherein said predetermined distance is from an edge of said display to a visible portion of said keyboard.

18. The computer program product of claim 16, wherein said predetermined distance is from an edge of said display to a non-visible portion of said keyboard.

19. The computer program product of claim 16, wherein said end key is a base note of said musical key.

20. The computer program product of claim 16, wherein said end key is a base note of the relative minor of said musical key.

21. The computer program product of claim 16, further comprising instructions causing a computer to detect a held note on said display whereby, when a first note and a second note are being played simultaneously on said keyboard, a user initiates a contact swipe motion with respect to said first note being played on said keyboard while said second note continues to be held, such that said second note continues to be played while, as a result of scrolling, it is no longer in contact with a user's finger that remains in contact with said touch-sensitive display at the original position of said second note.

22. The computer program product of claim 21, further comprising instructions causing a computer to play a third note in response to a user contacting a visible key on said keyboard while said second note continues to be played.

23. The computer program product of claim 16, further comprising instructions causing a computer to display a second musical instrument keyboard adjacent to said first musical instrument keyboard, wherein said second musical instrument keyboard is linked to said first musical instrument keyboard such that scrolling of one keyboard causes automatic scrolling of the other keyboard.

24. A system comprising:
one or more processors; and
a computer-readable medium including one or more sequences of instructions which, when executed by the one or more processors, causes:
  displaying a first musical instrument keyboard on a display, wherein said keyboard contains more keys than are simultaneously visible on said display; and
  detecting a user contact swipe motion in a predetermined direction along said keyboard, scrolling said keyboard across said display in accordance with said motion, and stopping said scrolling upon termination of user contact swipe motion; and
  detecting a held note on said display whereby, when a first note and a second note are being played simultaneously on said keyboard, a user initiates a contact swipe motion with respect to said first note being played on said keyboard while said second note continues to be held, such that said second note continues to be played while, as a result of scrolling, it is no longer in contact with a user's finger that remains in contact with said touch-sensitive display at the original position of said second note.

25. The system of claim 24, wherein the instructions cause playing a third note in response to a user contacting a visible key on said keyboard while said second note continues to be played.

* * * * *

UNITED STATES PATENT AND TRADEMARK OFFICE
CERTIFICATE OF CORRECTION

| | |
|---|---|
| PATENT NO. | : 8,516,386 B2 |
| APPLICATION NO. | : 12/893971 |
| DATED | : August 20, 2013 |
| INVENTOR(S) | : Adam et al. |

It is certified that error appears in the above-identified patent and that said Letters Patent is hereby corrected as shown below:

In the Claims

Column 11, Line 40 at Claim 6;
"tions cause for detecting a held note on said display whereby,"
should read -- tions cause detecting a held note on said display whereby, --

Signed and Sealed this
Tenth Day of December, 2013

Margaret A. Focarino
*Commissioner for Patents of the United States Patent and Trademark Office*